United States Patent
Naffziger

(10) Patent No.: US 8,942,932 B2
(45) Date of Patent: Jan. 27, 2015

(54) DETERMINING TRANSISTOR LEAKAGE FOR AN INTEGRATED CIRCUIT

(75) Inventor: Samuel D. Naffziger, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1185 days.

(21) Appl. No.: 12/872,916

(22) Filed: Aug. 31, 2010

(65) Prior Publication Data

US 2012/0053897 A1    Mar. 1, 2012

(51) Int. Cl.
G21C 17/00 (2006.01)
G06F 17/30 (2006.01)
G06F 1/32 (2006.01)

(52) U.S. Cl.
CPC ................. *G06F 1/3206* (2013.01)
USPC ............................. 702/60; 713/300

(58) Field of Classification Search
CPC .......... G01R 21/02; G01R 21/04; G06F 1/28; G06F 1/32; G06F 1/3206; G06F 1/3234; H01L 27/12
USPC ............ 702/60, 130, 136, 182, 186; 700/299; 713/300, 320, 321
See application file for complete search history.

(56) References Cited

U.S. PATENT DOCUMENTS

| | | | | |
|---|---|---|---|---|
| 5,854,762 A * | 12/1998 | Pascucci | ................. | 365/185.04 |
| 7,038,483 B1 | 5/2006 | Suzuki et al. | | |
| 7,112,978 B1 | 9/2006 | Koniaris et al. | | |
| 7,366,997 B1 * | 4/2008 | Rahmat et al. | ................ | 716/111 |
| 7,412,353 B2 * | 8/2008 | Borkar et al. | ................ | 702/186 |
| 7,814,339 B2 * | 10/2010 | Monferrer et al. | ............ | 713/300 |
| 8,104,007 B2 * | 1/2012 | Kariat et al. | ................ | 716/110 |
| 2001/0052800 A1 * | 12/2001 | Mizuno | ............................ | 327/1 |
| 2003/0110012 A1 | 6/2003 | Orenstien et al. | | |
| 2005/0130432 A1 | 6/2005 | Machala, III | | |
| 2007/0244676 A1 * | 10/2007 | Shang et al. | ...................... | 703/2 |
| 2008/0022140 A1 | 1/2008 | Yamada et al. | | |
| 2009/0112550 A1 * | 4/2009 | Aikawa et al. | ................. | 703/14 |
| 2009/0235108 A1 | 9/2009 | Gold et al. | | |
| 2009/0259869 A1 | 10/2009 | Naffziger | | |

* cited by examiner

*Primary Examiner* — Manuel L Barbee

(74) *Attorney, Agent, or Firm* — Meyertons, Hood, Kivlin, Kowert & Goetzel, P.C.; Paul T. Seegers; Dean M. Munyon

(57) ABSTRACT

Techniques are disclosed relating to determining power consumption of an integrated circuit. In one embodiment, an integrated circuit is disclosed that includes a power monitor unit configured to receive a temperature of the integrated circuit, and to determine an estimate of power consumed by transistor leakage of the integrated circuit based on the received temperature. In one embodiment, to determine the estimate, the power monitor unit is configured to multiply a base value and a scaling factor that is adjusted based on the received temperature. In some embodiments, the power monitor unit is configured to receive performance state information of the integrated circuit, and to determine an estimate of power consumed by transistor leakage of the integrated circuit based on the performance state information.

21 Claims, 10 Drawing Sheets

| Performance States | V | Freq | Leakage Power Estimate | Switching Power Estimate | Leakage Scaling Factor | Switching Scaling Factor |
|---|---|---|---|---|---|---|
| P0 | 1.175 V | 2.70 GHz | 4.293 W | 8.310 W | 1.00 | 1.00 |
| P1 | 1.000 V | 2.20 GHz | 2.026 W | 4.484 W | 0.47 | 0.54 |
| P2 | 0.875 V | 1.60 GHz | 1.200 W | 2.397 W | 0.28 | 0.29 |
| P3 | 0.825 V | 1.30 GHz | 0.968 W | 1.727 W | 0.23 | 0.21 |
| P4 | 0.750 V | 0.80 GHz | 0.676 W | 0.785 W | 0.16 | 0.09 |

FIG. 9

DETERMINING TRANSISTOR LEAKAGE FOR AN INTEGRATED CIRCUIT

BACKGROUND

1. Technical Field

This disclosure relates generally to integrated circuits, and, more specifically, to power management within integrated circuits.

2. Description of the Related Art

As processing demands for processors increase, power consumption and heat dissipation have become an important concern in processor design. Designers typically create processors that are designed to operate in predetermined temperature and power ranges. Ensuring that a processor operates in these ranges while maximizing a processor's performance can be difficult. As a result, certain processors now include a power management system that manages processor operation to maintain a balance between these two goals.

A power management system typically manages operation of a processor by determining temperatures and power consumption of the processor. This information can be used to determine whether a processor is overheating (and thus needs to be powered down). This information can also be used to determine permissible performances states of a processor. For example, if a processor management system determines that a processor is about to exceed temperature or power constraints, the system may instruct the processor to operate at a lower performance state.

SUMMARY OF EMBODIMENTS

Various embodiments of structures and methods for determining power consumption of an integrated circuit are disclosed herein. The description presented herein may be applicable to any integrated circuit that determines power consumption, including any suitable type of processor (as described further below). Thus, while the description below is described with reference to a processor, the description is also intended to cover integrated circuits generally, particularly those that include determine power consumption.

In one embodiment, an integrated circuit is disclosed that includes a power monitor unit. The power monitor unit is configured to receive a temperature of the integrated circuit, and to determine an estimate of power consumed by transistor leakage of the integrated circuit based on the received temperature.

In another embodiment, a processor is disclosed that includes a power monitor unit. The power monitor unit is configured to receive performance state information of the processor, and to determine an estimate of power consumed by transistor leakage of the processor based on the performance state information.

In yet another embodiment, a method is disclosed. The method includes a processor obtaining a base estimate of power consumed by transistor leakage of the processor. The method further includes the processor scaling the base estimate based on a performance state of the processor and a temperature of the processor.

In still another embodiment, a computer readable storage medium is disclosed. The computer readable storage medium includes a data structure, which is operated upon by a program executable on a computer system, the program operating on the data structure to perform a portion of a process to fabricate an integrated circuit including circuitry described by the data structure. The circuitry described in the data structure includes a power monitor unit. The power monitor unit is configured to receive a temperature of the integrated circuit, and to determine an estimate of power consumed by transistor leakage of the integrated circuit based on the received temperature.

BRIEF DESCRIPTION OF THE DRAWINGS

FIG. 9 is a table illustrating an exemplary relationship of performance states and power consumption.

DETAILED DESCRIPTION

Figure 1:
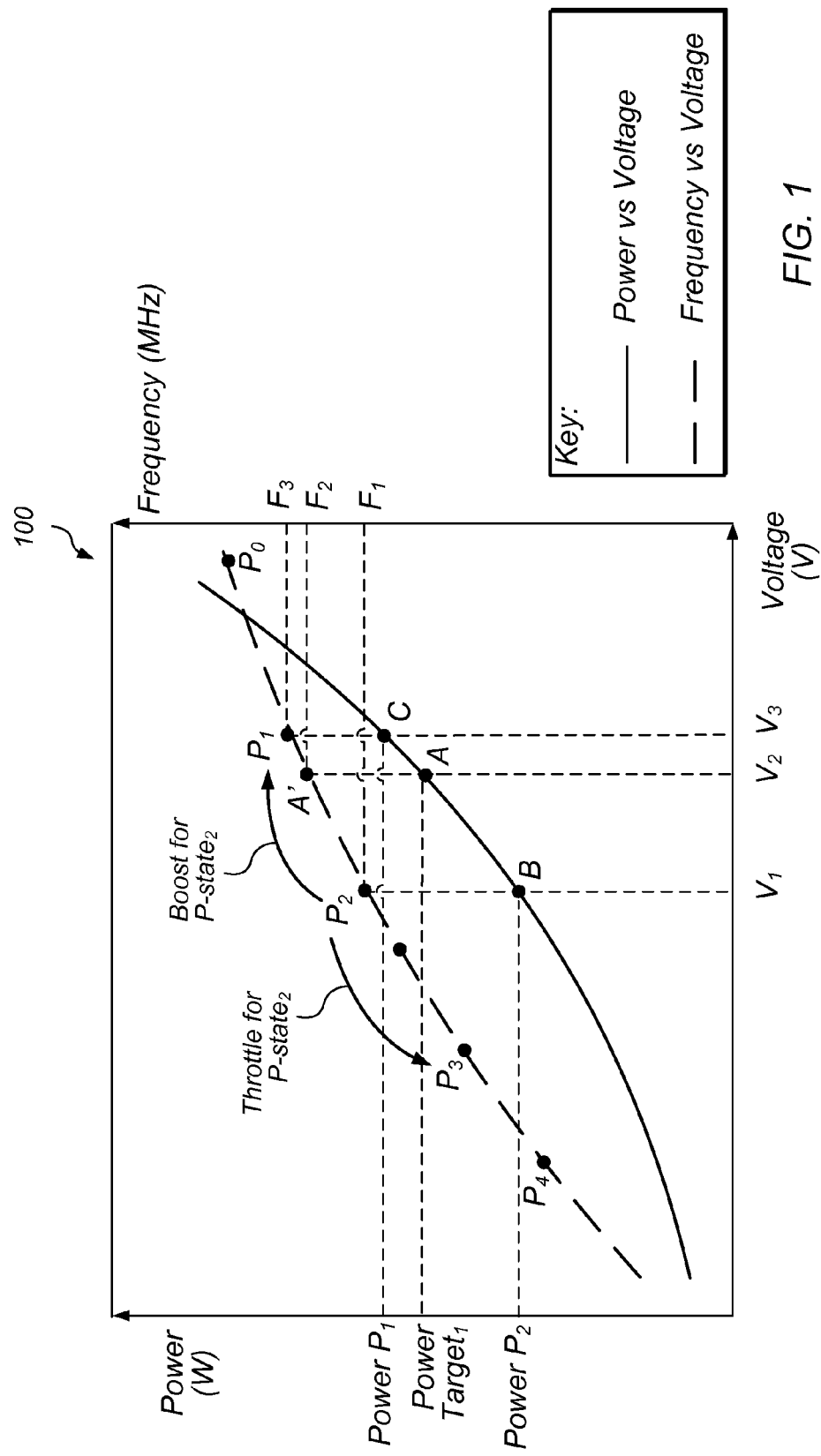
FIG. 1 is a graph illustrating performance state transitions for one embodiment of a processor.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. "Configure to" may also include adapting a manufacturing process (e.g., a semiconductor fabrication facility) to fabricate devices (e.g., integrated circuits) that are adapted to implement or perform one or more tasks.

First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Processor." This term has its ordinary and accepted meaning in the art, and includes a device that is capable of executing computer instructions. A processor may refer, without limitation, to a central processing unit (CPU), a co-processor, an arithmetic processing unit, a graphics processing unit, a digital signal processor (DSP), etc. A processor may be a superscalar processor with a single or multiple pipelines. A processor may include a single or multiple cores that are each configured to execute computer instructions.

"Power Consumption." This term has its ordinary and accepted meaning in the art, and includes an amount of power being used by a processor or structures within a processor. For example, in one embodiment, a processor may consume 10 Watts of power during normal operation.

"Transistor Leakage." As used herein, this term refers to the tunneling of electrons or holes through an insulating region of a transistor. For example, transistor leakage may refer to the tunneling of electrons though a gate-insulating layer of a MOSFET transistor. Transistor leakage is one source of power consumption that may account for 20-30% of the power consumed by a processor in some instances. Power consumed by transistor leakage may be referred to as static power consumption because transistor leakage, in some instances, does not change with changing of a processor's workload.

"Transistor Switching." As used herein, this term refers to the process of changing a transistor from an ON state to an OFF state or vice versa. Transistor switching is another source of power consumption that may, in some instances, account for 70-80% of the power consumed by a processor. An amount of power being consumed by transistor switching can be expressed as a function of $Cv^2f$, where is C is the capacitance of one or more transistors, v is the operating voltage, and f is the frequency that a transistor's state is changed.

Introduction

Certain prior processors calculated power consumption using current and temperature sensors. The accuracy of current and temperature measurements using these sensors is subject to external factors, however. For example, temperature measurements for a processor may be affected by the processor being located in a hot server room with poor ventilation. Because processors can be subject to different external factors, the performance of processors is not always consistent when power consumption is calculated using only values received from current and temperature sensors. Power consumption can be more consistently and accurately determined if power consumption is based on estimates of power consumption due to two components: power consumption based on transistor leakage, and power consumption based on transistor switching.

The present disclosure describes techniques for determining an estimate of power consumed due to transistor leakage. In one embodiment, a processor is disclosed that includes a power monitor configured to receive a temperature of the processor and to determine an estimate of power consumed by transistor leakage of the processor, where the transistor leakage power estimate is based on the received temperature. In some embodiments, to determine the estimate, the power monitor unit is configured to multiply a base estimate and a scaling factor that is adjusted based on the temperature. In one embodiment, the processor is further configured to determine an estimate of power consumed by transistor switching of the processor, and to select a performance state based on the estimate of power consumed by transistor leakage and the estimate of power consumed by transistor switching.

The present disclosure first describes techniques, in conjunction with FIGS. 1-5, for selecting performance states of a processor based on that processor's power consumption. Next, techniques for determining an estimate of power consumed by transistor leakage are described in conjunction with FIGS. 6-10. Finally, an exemplary computer that may include the processor is described in conjunction with FIG. 11.

Selecting Performance States Based on a Calculated Power Consumption

Turning now to FIG. 1, a graph 100 illustrating performance state transitions for one embodiment of a processor is shown. The two curves shown in graph 100 illustrate non-linear (e.g., cubic or quadratic) relationships between power versus voltage and frequency versus voltage. Five discrete performance states (P-states) are also shown denoted as P0 to P4. Although only five discrete P-states are shown, more (or less) discrete P-states may be supported in some embodiments.

In graph 100, the P-state P4 corresponds to a discrete state with a lowest performance of all the supported discrete states and comprises the lowest operational frequency. In addition, the P-state P4 corresponds to a discrete state with a lowest power consumption of all the supported discrete states and comprises the lowest operational voltage. On the other hand, the P-state P0 corresponds to a discrete state with a highest performance of all the supported discrete states and comprises the highest operational frequency. In addition, the P-state P0 corresponds to a discrete state with a highest power consumption of all the supported discrete states and comprises the highest operational voltage. Typically, the endpoint discrete states represented by P-states P0 and P4 define a region of predictable performance. Therefore, configuring a processor to support multiple P-states, or operating points, along the non-linear frequency versus voltage curve may provide stable, optimal utilization of power and delivery of performance for the processor. In some embodiments, the management of the P-states may conform to an industry standard such as the Advanced Configuration and Power Interface (ACPI) standard.

In one embodiment, a power target$_1$ is chosen for the processor, wherein the power target$_1$ represents an initial value for the thermal design power (TDP) of the processor. The TDP, which may also be referred to as a thermal design point, represents a maximum amount of power a cooling system in a computer is able to dissipate. For example, in one embodiment, a cooling system for a laptop processor may be designed for a 20 watt TDP, where the cooling system is able to dissipate 20 watts without exceeding the maximum junction temperature for transistors within the processor. The TDP value may differ depending on the manufacturer producing the processor. For example, one manufacturer may define the TDP value as a power value measured at a default voltage level under predetermined worst-case temperature conditions. Another manufacturer may define the TDP value as a maximum power value measured over a predetermined interval as the processor executes typical applications versus high-power applications. Other measurement definitions are possible and contemplated.

In one embodiment, a power model executed on a pre-silicon model of a processor may determine a power measurement. Later in a design cycle, power measurements may be determined for actual fabricated processors during a testing phase and debugging phase. In one embodiment, a peak power value for a processor may be defined by functional failure of the processor executing a high-power application. The TDP value is typically less than the peak power value. The TDP value may be used to set the operational voltage and the operational frequency of a processor for binning (sorting) purposes.

The value power target$_1$ in FIG. 1 may represent an assigned TDP value. As shown in FIG. 1, the power target$_1$ corresponds to a data point A on the power versus voltage non-linear curve. Data point A corresponds to an operating voltage $V_2$. Projecting data point A onto the non-linear frequency versus voltage curve with respect to the operating voltage $V_2$ provides data point A'. The data point A' corresponds to an operating frequency $F_2$. The operating point represented by the combination of the operating voltage $V_2$ and the operating frequency $F_2$ may provide an optimal utilization of power and delivery of performance for the processor.

As described above and shown in graph 100, an operating point for power target$_1$ is identified by data point A'. However, this operating point is not represented by a discrete P-state on the power versus frequency curve. The data point A' is located between the P-states P1 and P2. In order to reduce power consumption, the P-state P2 may be chosen as an initial operating point for the corresponding processor. A corresponding combination of the operating voltage $V_1$ and the operating frequency $F_1$ may be the resulting chosen operating point. This operating point corresponds to a lower power consumption value than the value power target$_1$. The value Power P2 indicates the lower power consumption value of the operating point corresponding to the P-state P2.

A processor may continue processing workloads utilizing an initially assigned P-state until either (i) the workload significantly changes which causes a significant change in a reported activity level, or (ii) the initial TDP value changes, such as being adjusted by a power monitoring software or firmware, which changes the power target value. For example, if a processor is executing instructions for a workload that is halved at a given point in time, the resulting total drawn current and thermal energy will be significantly reduced. In one embodiment, a power manager (e.g., power manager unit 140 described below), which may be located within the processor, may detect this condition and accordingly choose a different P-state corresponding to a higher power-performance operating point. For example, the power manager may determine to increase, or boost, the current P-state P2 to the higher performance P-state P1.

A "throttle" of a P-state includes decrementing the currently selected P-state by one P-state to a lower power consumption P-state. In contrast, a "boost" of a P-state includes incrementing the currently selected P-state by one P-state to a higher performance P-state. Throttling the P-state P2 includes transitioning the currently selected P-state P2 to the lower power-performance state P3. A simple illustration of boosting and throttling a given P-state, such as the P-state P2 as an example, is shown in FIG. 1. In some embodiments, each boost operation and each throttle operation may cause a currently selected P-state to transition by two or more P-states when the logic supports this added complexity. The P-state transitions may be controlled by logic within a processor, and thereby is a self-contained system. However, power management software running on the processor or a rack controller located external to the processor, may alter the TDP value for the processor, which changes the power target value.

Although the operating point represented by the P-state P2 in FIG. 1 consumes less power than the power target$_1$ value, the operating point represented by P2 also has less performance. Rather than maintain a lower performance P-state until a significant change in a measured activity level, a processor may toggle between two discrete P-states in order to achieve an average "virtual" operating point for the current workload. For example, a power manager may determine for a same workload an amount of time to utilize P-state P2 before boosting to P-state P1. Similarly, the power manager may determine for the same workload an amount of time to utilize P-state P1 before throttling to P-state P2. This process may occur multiple times until the workload significantly changes. An average of the times spent in a particular P-state coupled with the operating voltage and frequency may have an effect the processor was utilizing a "virtual" operating point represented by data point A' in FIG. 1. Such a method would enable flexible power management with arbitrary power limit settings to achieve stable virtual operating points for any workload by building on already existing discrete P-states.

Figure 2:
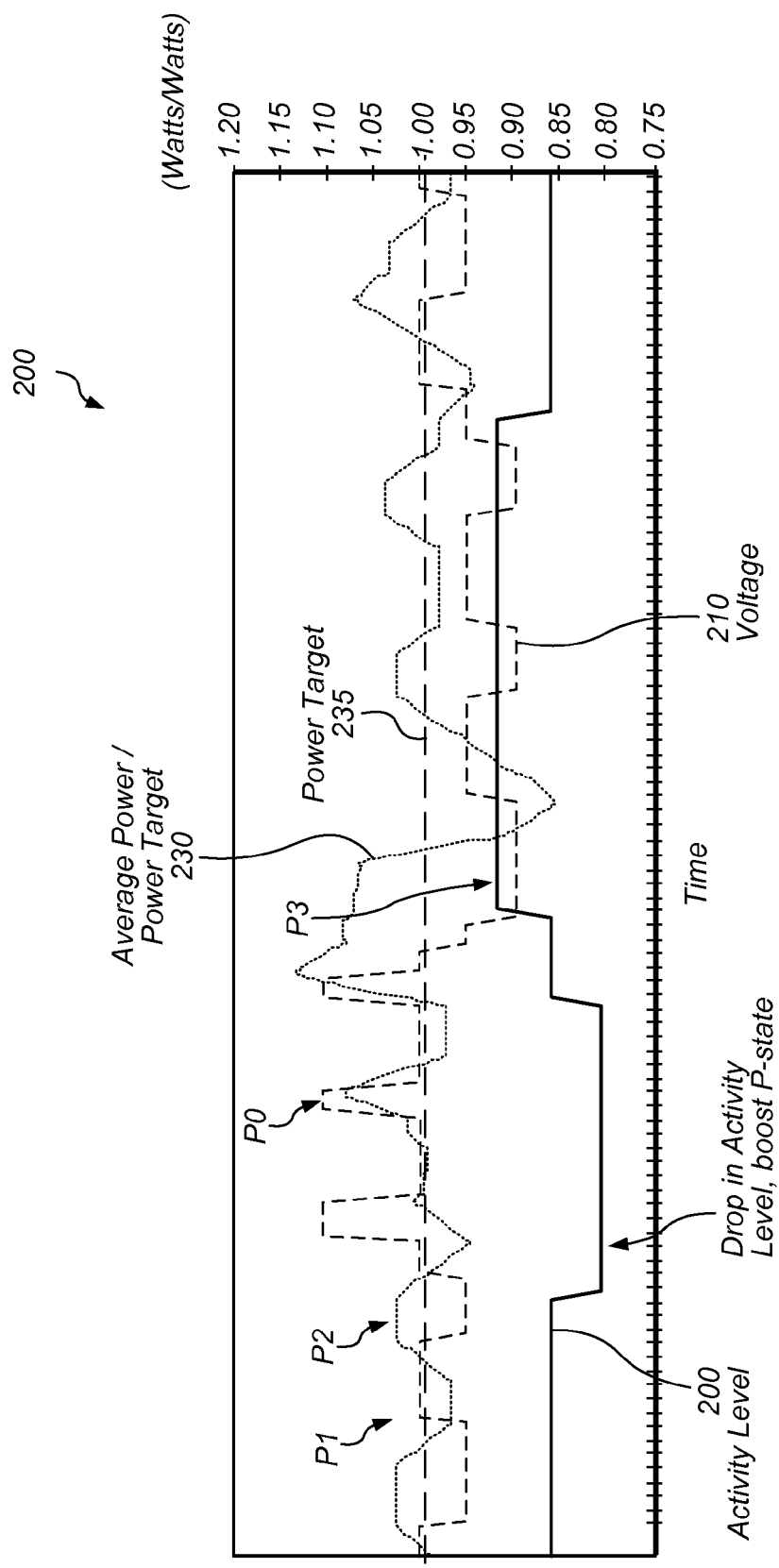
FIG. 2 is a graph illustrating operation of one embodiment of a power management system in a processor.

Turning now to FIG. 2, a graph 200 illustrating operation of one embodiment of a power management system is shown. Changes to an operational voltage 210 and a measured activity level 220 over time are shown. In addition, an average power versus a power target ratio 230 is shown over time. As shown in FIG. 2, there are P-state transitions both when an activity level experiences a significant change and when the activity level is constant. In graph 200, the P-state transitions correlate with the changes in the operating voltage 210. Some P-state values are labeled in graph 200. For example, with a constant activity level 220, a P-state P1 transitions to P-state P2, which has a lower operating voltage. Toggling between P-state values when the measured activity level is constant may be referred to as P-state dithering. The P-state dithering may be used to maintain a ratio close to unity between an average power consumed on the processor and a power target, such as a TDP value. By maintaining such a ratio close to unity, the processor may constantly maximize performance while still consuming an amount of power dissipated by a corresponding cooling system.

Figure 3:
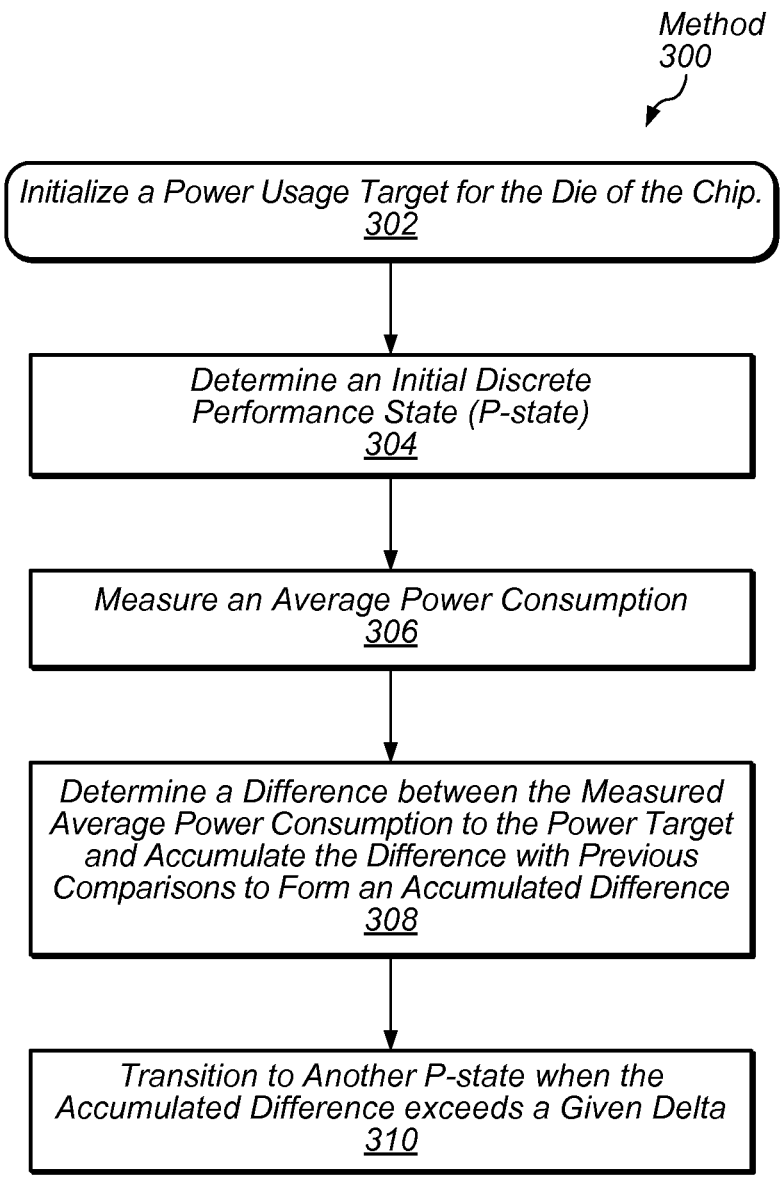
FIG. 3 is a flow diagram of one embodiment of a method for managing multiple discrete operating points to create a stable virtual operating point.

Turning now to FIG. 3, one embodiment of a method 300 for managing multiple discrete operating points to create a stable virtual operating point is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 302, a power usage target for a processor (e.g., processor 10 described below) is initialized. Any of the methods described earlier may be used. In block 304, an initial discrete power-performance state (P-state) for the processor is determined at a given workload. Software, such as firmware, or hardware may determine the P-state. Average power consumption for the processor is measured in block 306. Further details of such a measurement are provided below in conjunction with FIGS. 4 and 5. In block 308, the measured average power consumption is compared to the power target.

In block 310, when the comparison reaches a predetermined threshold, a transition to another P-state may occur although the given workload has not significantly changed. Referring again to FIG. 2, the activity level 220 may track the workload. As shown in FIG. 2, the P-state transitions occur when the ratio of average power to power target varies significantly from unity. A predetermined threshold may determine when a significant change occurs. Alternatively, an accumulated signed difference may be found between the measured average power and the power target, rather than a ratio. Before further details are provided, one embodiment of measuring an activity level to track the workload is described.

Figure 4:
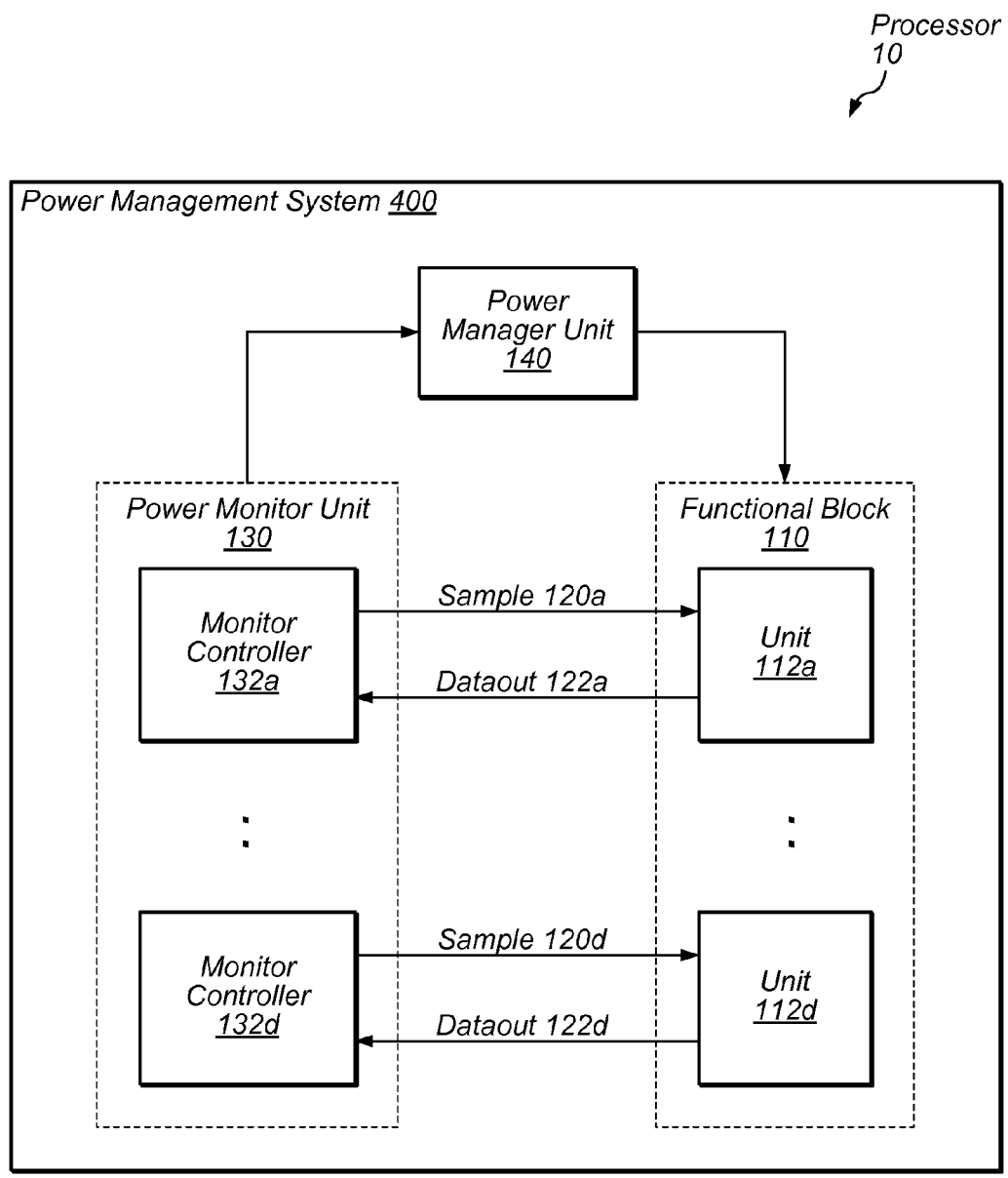
FIG. 4 is a block diagram of one embodiment of a processor that includes a power management system.

Turning now to FIG. 4, one embodiment of a processor 10 that includes a power management system 400 is shown. Processor 10 may be any suitable type of processor such as those described above. In some embodiments, processor 10 may be a superscalar processor with a single pipeline or multiple pipelines. In some embodiments, processor 10 may include multiple cores. In the illustrated embodiment, processor 10 includes power management system 400, which, in turn, includes power monitor unit 130, power manager unit 140, and one or more functional blocks 110. (In some embodiments, the one or more functional blocks 110 may not be considered as part of system 400.) In some embodiments, power management system 400 may be one of a plurality of power management systems that are each configured to manage operation of a respective core of processor 10.

A functional block 110 may include transistors configured to perform logic functions, data storage, etc. For power management purposes, functional block 110 may, in some embodiments, be divided into units 112a-112d. (As used herein, elements referred to by a reference numeral followed by a letter may be collectively referred to by the numeral alone. For example, units 112a-112d may be collectively referred to as units 112.) In one embodiment, units 112 may correspond to functional components of processor 10, such as a reorder buffer, a memory management unit, an execution unit, and so forth. In some embodiments, units 112 may be selected based on the types of signals to be sampled for power management purposes. For example, in one embodiment, signals selected to be sampled include clock enable signals routed to local clock distribution blocks.

The selection of which signals to sample during a particular clock cycle may correspond to how well the selection correlates to the amount of switching node capacitance within units 112. The selected signals to be sampled, such as clock enable signals, may overlap functional blocks in the floorplan. Therefore, the division separating, for example, unit 112a and 112b may not correspond to a division in the floorplan. Units 112 may consume power that is measured in real-time. The activity level of processor 10 associated with a current workload may correspond to values, or weights, associated with selected signals to be sampled.

In one embodiment, power monitor unit 130 may be used to collect data from units 112, such as the logic values of all the predetermined sampled signals. In one embodiment, the values of the sampled signals may be scanned out in a serial manner. Selected signals may be sampled in a single clock cycle from each of units 112 and serially scanned out before the next sample is performed. After collecting the data, power monitor unit 130 may calculate a power consumption estimate. One monitor controller 132 may correspond to each unit 112. In some embodiments, a monitor controller 132 may collect data from two or more units 112 and calculate total power consumption estimation for those units 112. In some embodiments, one monitor controller 132 (e.g., controller 132a) may have a signal interface with one or more other monitor controllers 132 (e.g., controllers 132b-132d) in order to collect data from the one or more monitor controllers 132. Then a power consumption estimate for the one or more monitor controllers 132 may be calculated.

The signals sample 120 and dataout 122 may be control and data signals used for power management purposes. The interface signals between power monitor unit 130 and functional block 110 may comprise any necessary number of signals and communication protocols. In one embodiment, the control signal sample 120 may be asserted for a single clock cycle only during a chosen repeating interval, such as every 100 clock cycles. In one embodiment, at a predetermined number of clock cycles after the control signal sample 120 is asserted, the data signal dataout 122 may begin providing a logic value for a different sampled signal each clock cycle. In other words, the data signal dataout 122 may be used to scan out a chain of values comprising the logic values of the sampled signals at a particular cycle. Also, in other embodiments, there may not be a single pair of signals between each monitor controller 132 and unit 112 pair. In an alternative embodiment, additional signals may be included in order for a monitor controller 132 to poll a unit 112, for a unit 112 to acknowledge to a monitor controller 132 that it is ready to convey output data.

A multiple number of samples may be taken during a predetermined time interval. The determination of the number of intervening clock cycles to use before computing an activity level may depend on the desired accuracy and confidence of the sampled data. A spreadsheet, or a look-up table, may be generated using both statistical analysis and measurements of both the real power consumption of an application and estimated power consumption from a sampling. A confidence level and an error rate may be chosen to further develop the statistical analysis. An example of a real-time power estimation method includes application Ser. No. 12/101,598, filed Apr. 11, 2008, entitled "Sampling Chip Activity for Real Time Power Estimation" ("the '598 application"). The '598 application is incorporated by reference herein in its entirety.

When the power monitor unit 130 calculates a power consumption estimate from the data received from functional block 110 over repeated intervals, the power monitor unit 130 has determined a power profile of the currently running application(s). This determination is conveyed to the power manager unit 140. The power manager unit 140 may alter an operating point of functional block 110 in order to decrease (or increase) power if the application is above (below) a threshold limit. For example, the power manager unit 140 may cause a boost or a throttle of a current P-state to transition to another predetermined P-state.

In one embodiment, during the specified time period named above, the power manager unit 140 may compute a signed running accumulated difference between the power profile provided by the power monitor unit 130 and the power target. Again, the power target may be a thermal design point (TDP). The accumulated difference may be calculated at the end of each predetermined time interval as AccTdpDelta=AccTdpDelta +(TDP−RcvdPwr). Here, the variable AccTdpDelta is the signed running accumulated difference. The variable TDP is the assigned thermal design power, or an equivalent number of thermal credits. The variable RcvdPwr is the power consumption estimation received from the power monitor unit 130. This value may track the activity level of the processor 10 by measuring the sampled signals in the functional blocks 110.

If the measured activity level represented by the variable RcvdPwr is higher than the TDP, then the accumulated value AccTdpDelta drifts toward a negative value. When the accumulated value reaches a negative predetermined threshold, the power manager may determine to throttle the current P-state. Referring again to FIG. 1, an example of throttling a current P-state would be to transition from P-state P1 to P-state P2. Such a condition may occur when the activity level is high within a core. If the activity level remains at a high value, over time the power manager may continue to throttle the current P-state.

If the measured activity level is lower than the TDP, then the accumulated value AccTdpDelta drifts toward a positive value. When the accumulated value reaches a positive predetermined threshold, the power manager unit 140 may determine to boost the current P-state. Referring again to FIG. 1, an example of boosting a current P-state would be to transition from P-state P2 to P-state P1. Such a condition may occur when the activity level is low within the core. If the activity level remains at a low value, over time the power manager may continue to boost the current P-state.

The power manager unit 140 may be able to provide quicker responses to potential thermal problems in processor 10 when the information sent from the power monitor unit 130 corresponds to actual activity levels and power consumption within processor 10 and not temperature information. Analog or digital thermal sensors placed throughout processor 10 may determine a temperature waveform over time. The thermal sensors provide information as to when processor 10 heats up in a particular area due to increased compute activity. However, these sensors respond to each change in thermals, whether the change is driven by an increase in power consumption by processor 10 or by an external environmental factor, such as a rise in ambient temperature. For example, surrounding servers in a rack system in a data center may cause a rise in ambient temperature. The amount of switching capacitance within a particular core may not change over a time interval, but the sensors may report higher thermal energy consumption due to the rise in ambient temperature. In addition, there may be a time delay between an increase in power consumption and a temperature increase. Therefore, while attempting to maintain a ratio of unity between average power consumption and a power target, measurements associated with an activity level and switching capacitance within a core versus measurements of temperature may provide better results.

Figure 5:
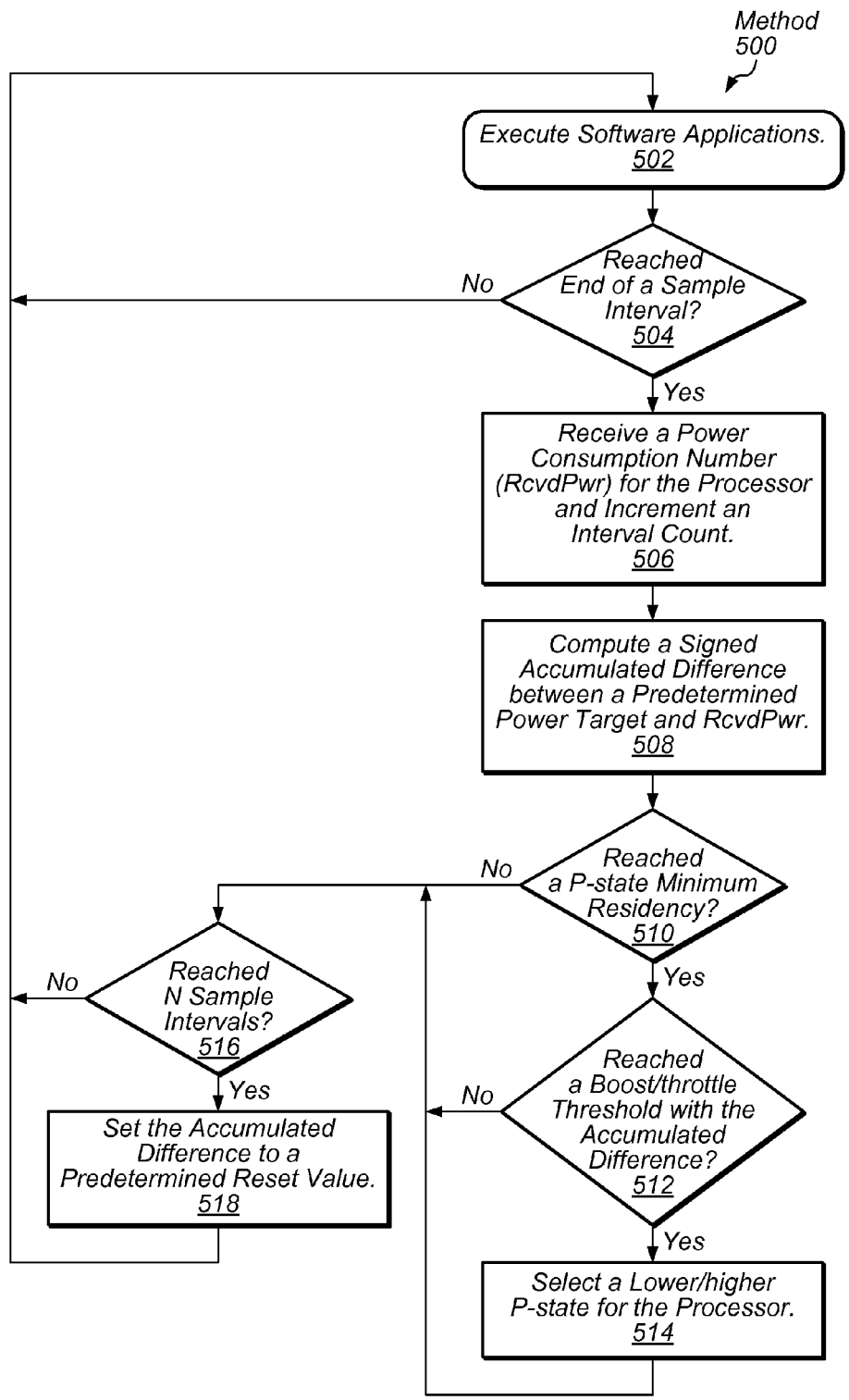
FIG. 5 is a flow diagram of one embodiment of a method for managing multiple discrete operating points to create a stable virtual operating point.

Turning now to FIG. 5, another embodiment of a method 500 for managing multiple discrete operating points to create a stable virtual operating point is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 502, a processor (e.g., processor 10) executes instructions of one or more software applications. If the end of a predetermined sampling interval is reached (conditional block 504), then in block 506, a power consumption estimate is determined and conveyed to a power manager. A power consumption estimate may be found by sampling selected signals in functional blocks and associating corresponding weights to the sampled signals as described earlier. A counter corresponding to a count of determined power estimation values may be incremented. In block 508, the power manager may compute a signed accumulated difference between a predetermined power target, such as a TDP, and the received power consumption number. The computation as described earlier may be AccTdpDelta=AccTdpDelta+(TDP−RcvdPwr), wherein the variable RcvdPwr represents the received power consumption number.

It is noted when a P-state transition occurs, the signed accumulated difference, AccTdpDelta, may still exceed a predetermined threshold by the time another sample interval occurs. For example, a boost from a P-state P2 to a P-state P1 may occur due to the value AccTdpDelta is greater than a positive boost threshold. After the P-state transition, at the next time interval, the signed accumulated difference, AccTdpDelta, may still be greater than the positive boost threshold. There may not have been sufficient time for the measured power consumption value to exceed the TDP value. Therefore, it may be possible to rapidly continue boosting the current P-state before determining whether the current P-state provides the best power-performance operating point at a given time.

In order to avoid rapid P-state transitions as described above, a following P-state transition may not be allowed to occur for a predetermined time after a current P-state transition. The predetermined time may be referred to as a minimum residency. In one embodiment, a counter may be used to determine whether a permissible amount of time has elapsed following a current P-state transition. The counter value may be compared to a predetermined threshold. Alternatively, the counter may be loaded with the predetermined threshold and decremented to a value of zero. When this permissible amount of time has elapsed, another P-state transition may occur.

In addition, value aging for the accumulated difference AccTdpDelta may be used. Value aging may aid in preventing overheating of the processor. An aged accumulated difference may remain transitioning, or dithering, between high power P-states for a long time. The thermal energy may continue accumulating although a P-state is throttled. Therefore, from time to time, the accumulated difference AccTdpDelta may be set to a reset value at the end of a predetermined time period. The reset value may vary from a fraction of the current value of the accumulated difference AccTdpDelta to zero. A value stored in a configuration register may be used to determine the reset value. For example, a first stored value may correspond to a reset value equal to the accumulated difference AccTdpDelta. A second stored value may correspond to a reset value equal to the accumulated difference AccTdpDelta shifted (e.g., divide by 2, divide by 4, and so forth). A third stored value may correspond to a reset value equal to zero.

A counter, which may be decrementing in one example, may set the predetermined time period referred to above. The counter may load a value N, which is stored in a configuration register. After N samples occur, wherein the accumulated difference AccTdpDelta is updated at the end of each sample, or time interval, accumulated difference AccTdpDelta may be reset. The counter loaded with the value N may be reset each time the accumulated difference AccTdpDelta changes sign.

Referring again to method 500 in FIG. 5, if a P-state minimum residency time period has not been reached (conditional block 510), then a check is performed regarding whether N samples have occurred. At the end of each sample interval, a new power consumption number for the processor is determined and a new value is computed for the accumulated difference AccTdpDelta. If a count of N samples has occurred (conditional block 516), then in block 518, accumulated difference AccTdpDelta is set to a predetermined reset value as described above.

If a P-state minimum residency time period has been reached (conditional block 510), then a check is performed regarding the boost and throttling thresholds. A comparison may be performed to determine whether the signed accumulated difference AccTdpDelta exceeds a threshold. For example, the accumulated difference AccTdpDelta may be greater than a positive boost threshold. Alternatively, the accumulated difference AccTdpDelta may be less than a negative throttle threshold. If the accumulated difference AccTdpDelta exceeds a threshold (conditional block 512), then in block 514, a corresponding next P-state is selected for the processor. For example, if the signed accumulated difference AccTdpDelta is greater than a positive boost threshold, then a transition to a higher power-performance P-state than the current P-state may occur. Alternatively, if the signed accumulated difference AccTdpDelta is less than a negative throttling threshold, then a transition to a lower power-performance P-state than the current P-state may occur.

In one embodiment, if a processor comprises multiple cores, a power consumption estimate may be computed within each core. In addition, each core may determine a signed accumulated difference, AccTdpDelta. When any of the multiple cores exceeds a boost or throttling threshold, the P-state for the entire processor may transition accordingly. Then control flow of method 500 moves to conditional block 516.

Calculating Power Consumption

A processor's power consumption is primarily due to transistor switching and transistor leakage. As will be described below, a processor may be configured to determine its power consumption by determining the power consumed by these two components. Various techniques for determining power consumed by transistor switching of a processor are described in the '598 application. Various techniques for determining power consumed by transistor leakage of a processor are described below.

Figure 6:
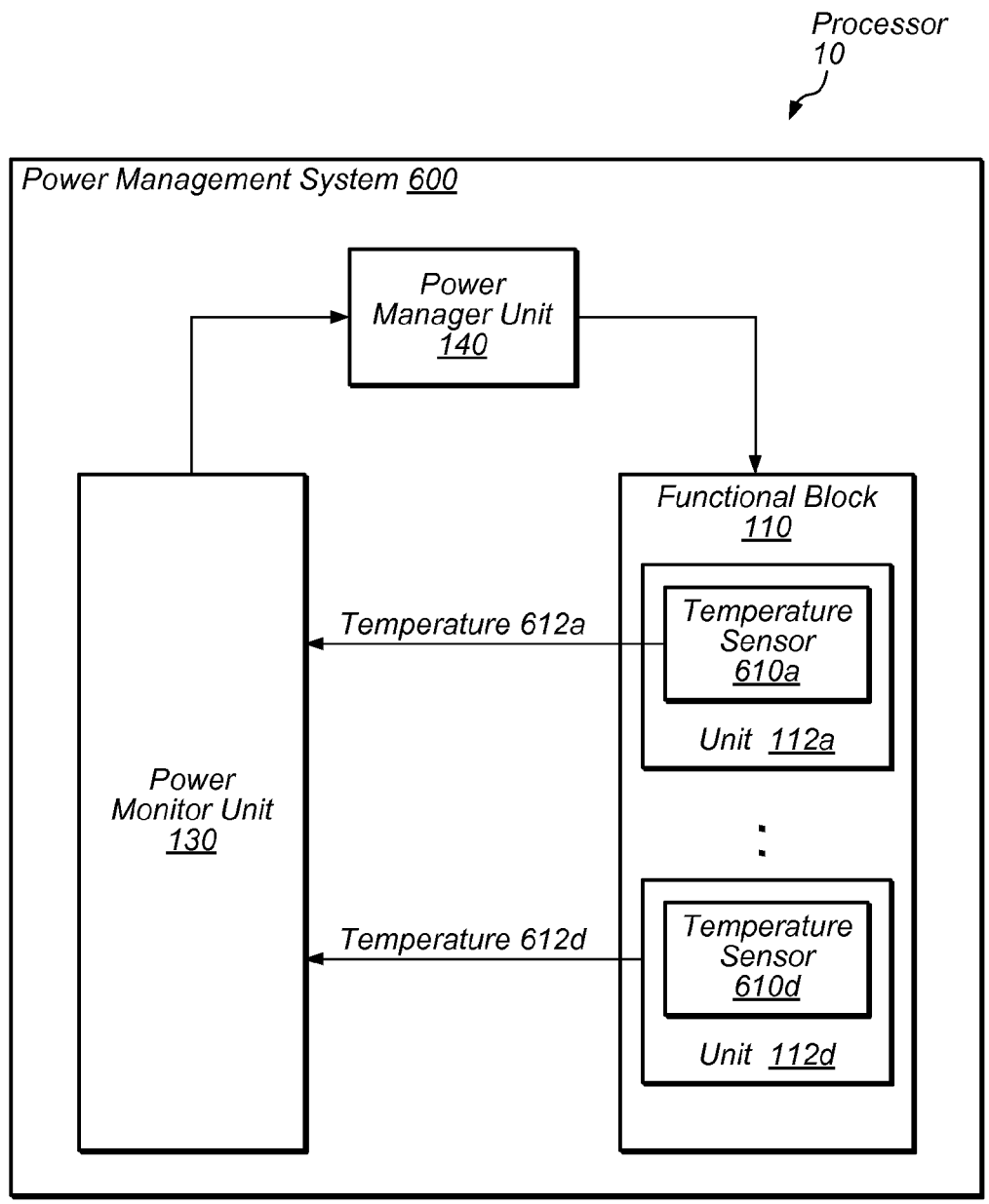
FIG. 6 is block diagram of one embodiment of a processor that is configured to determine an estimate of power consumed by transistor leakage.

Turning now to FIG. 6, one embodiment of processor 10 that is configured to determine an estimate of power consumed by transistor leakage is depicted. In the illustrated embodiment, processor 10 includes power management system 600, which includes power monitor unit 130, power manager unit 140, and one or more functional blocks 110. (In some embodiments, functional blocks 110 may not be considered as being a part of system 600). In various embodiments, power management system 600 implements features of system 400 described above. In some embodiments, power management system 600 may be one of a plurality of power management systems that are each configured to manage operation of a respective core of processor 10.

Temperature sensors 610, in one embodiment, are configured to measure temperatures 612 in units 112 in one or more blocks 110. Temperature sensors 610 may be arranged in any suitable manner. In some embodiments, temperature sensors 610 may be concentrated in areas that are likely to be significant sources of heat in processor 10. Temperature sensors 610 may use any suitable techniques to measure temperatures. In one embodiment, temperature sensors 610 are configured to determine temperatures using thermal diodes. In the illustrated embodiment, temperature sensors 610 are configured to provide determined temperatures 612 of units 112 to power monitor unit 130.

In some embodiments, processor 10 may be configured to determine temperature information for units 112 and/or blocks 110 without using temperature sensors 610. For example, in one embodiment, processor 10 may be configured to determine temperatures using a temperature model that estimates temperatures based on measured power consumptions. Thus, in some embodiments, units 112 may include power sensors instead of temperature sensors 610; the power sensors are configured to provide power information that is usable to determine temperature characteristics of a block 110.

Power monitor unit 130, in one embodiment, is configured to calculate a power consumption estimate for processor 10 (or a core within processor 10) by determining 1) an estimate of power consumed by transistor switching (i.e., a "switching power estimate") and 2) an estimate of power consumed by transistor leakage (i.e., a "leakage power estimate"). In various embodiments, power monitor unit 130 may be configured to calculate a switching power estimate using techniques described in the above-noted '598 application. In one embodiment, power monitor unit 130 is configured to determine a leakage power estimate based on temperatures 612. In some embodiments, power monitor unit 130 may also be configured to determine a leakage power estimated based on the performance state of processor 10 (or a core within processor 10).

In one embodiment, power monitor unit 130 is configured to determine a leakage power estimate by scaling a base estimate value based on temperatures 612 and/or performance state information. In one embodiment, the base estimate value is an estimate of the amount of power consumed by transistor leakage (e.g., 4.2 W) when operating at given temperature (e.g., 100° C.) and at given voltage (e.g., 1.0V). In one embodiment, if temperatures 612 indicate that processor 10 (or a core within processor 10) is operating above or below the given temperature (e.g., 95° C. or 105° C.), power monitor unit 130 may be configured to adjust this base estimate value accordingly—i.e., by increasing or decreasing the base estimate value. In some embodiments, power monitor unit 130 is configured to adjust the base estimate value based on an average temperature computed from temperatures 612. In other embodiments, power monitor unit 130 is configured to adjust the base estimate value based on a highest determined temperature 612. In one embodiment, if performance state information indicates that processor 10 (or a core within processor 10) is operating above or below the given frequency (e.g., 2.6 GHz or 2.8 GHz), power monitor unit 130 is configured to adjust the base estimate value. Power monitor unit 130 is described in further detail below in conjunction with FIG. 7.

As discussed above, power manager unit 140, in one embodiment, is configured to boost or throttle the current performance state for processor 10 (or a core within processor 10) based on the calculated power consumption estimate determined by power monitor unit 130. In some embodiments, power manager unit 140 is configured to determine whether to boost or throttle a performance state by computing a signed running accumulated such as described above. In various embodiments, power manager unit 140 may be configured to provide performance state information to power monitor unit 130 to facilitate calculation of power consumption estimates.

By determining a leakage power estimate based on measured temperatures and/or performance state information, processor 10, in some instances, is able to determine a more consistent and accurate estimate of power consumption. As a result, processor 10 can use this estimate select more appropriate performances states to achieve greater performance.

Figure 7:
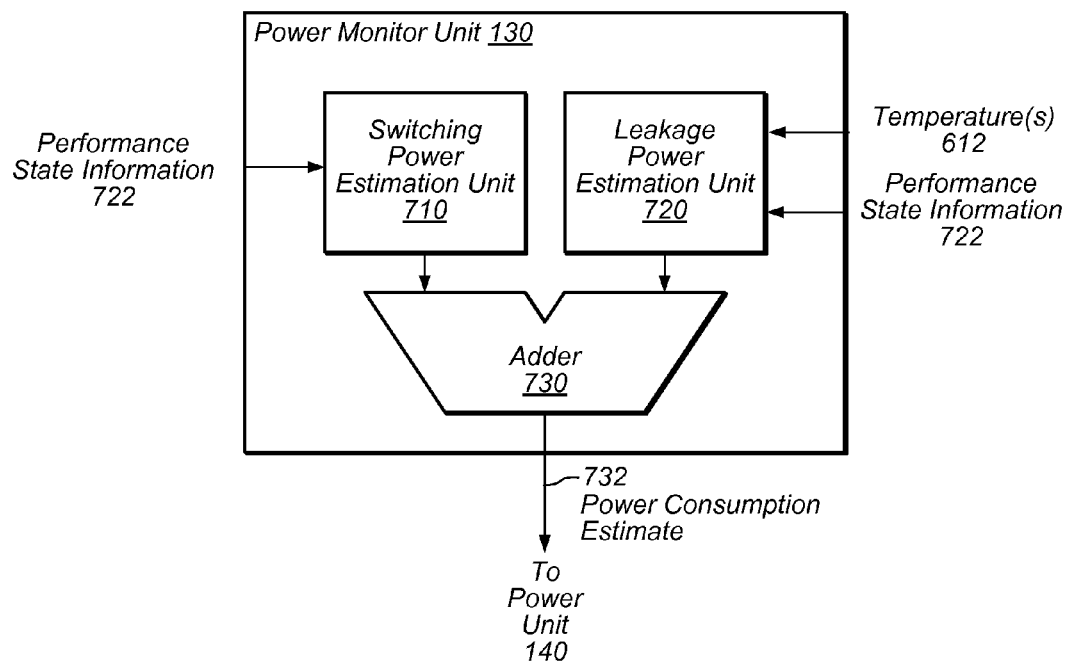
FIG. 7 is a block diagram of one embodiment of a power monitor unit included in a processor.

Turning now to FIG. 7, one embodiment of a power monitor unit 130 is depicted. As discussed above, in one embodiment, power monitor unit 130 is configured to determine a power consumption estimate for processor 10 (or a core within processor 10) by determining estimates of power consumption caused by transistor switching and transistor leakage. In the illustrated embodiment, power monitor unit 130 includes switching power estimation unit 710, leakage power estimation unit 720, and adder 730.

Switching power estimation unit 710, in one embodiment, is configured to determine a switching power estimate for processor 10 (or a core within processor 10). In some embodiments, unit 710 is configured to determine the switching power estimate by summing switching power estimates calculated for functional blocks 110 or units 112. In one embodiment, unit 710 is configured to determine a switching power estimate by scaling, based on performance state information 722 (described below), a base estimate value of power consumed by transistor switching. In various embodiments, unit 710 may be configured to use various techniques described in the '598 application to determine a switching power estimate.

Leakage power estimation unit 720, in one embodiment, is configured to determine a leakage power estimate for processor 10 (or a core within processor 10) based on one or more temperatures 612 and/or performance state information 722. As noted above, in various embodiments, temperatures 612 are temperatures measured by one or more sensors 610 or temperatures determined from a temperature model. In one embodiment, performance state information 722 specifies the current performance state of processor 10 (or a core within processor 10). In some embodiments, unit 720 is configured to receive performance state information 722 from power manager unit 140. In other embodiments, unit 720 is configured to receive performance state information 722 from other suitable sources.

In one embodiment, leakage power estimation unit 720 is configured determine the leakage power estimate by scaling a base estimation value based on one or more temperatures 612. As noted above, in one embodiment, the base estimation value specifies an amount of power consumed by transistor leakage at a given temperature and a given voltage (e.g., 4.2 W at 100° C. and at 1.0V). In one embodiment, if temperatures 612 indicate that processor 10 (or a core within processor 10) is operating below this given temperature (e.g., 80° C.), unit 720 is configured to determine the leakage power estimate by multiplying the base estimate value by a scaling factor that is less than 1.0. In one embodiment, if temperatures 612 indicate that processor 10 (or a core within processor 10) is operating above this given temperature (e.g., 105° C.), unit 720 is configured to determine the leakage power estimate by multiplying the base estimate value by a scaling factor that is greater than 1.0. In one embodiment, if temperatures 612 indicate that processor 10 (or a core within processor 10) is operating at the given temperature, unit 720 may be configured to determine a leakage power estimate by multiplying the base estimate value by a scaling factor of 1.0—thus having the effect of not scaling the base estimate value. Unit 720 may use any suitable base estimate value. In one embodiment, unit 720 is configured to use a base estimate value that specifies the power consumed by transistor leakage of processor 10 (or a core within processor 10) when it is operating at a maximum operating frequency and at a maximum temperature threshold. In other embodiments, the base estimate value may be an estimate based on other criteria. In some embodiments, unit 720 is configured to scale the base estimate value based on an average of temperatures 612. In other embodiments, unit 720 is configured to scale the base estimate value based on a highest determined temperature 612.

In one embodiment, leakage power estimation unit 720 is configured to scale the base estimate value based on the performance state of processor 10 (or a core within processor 10). For example, unit 720 may be configured to multiply the base estimate value by a smaller scaling factor (e.g., 0.47) if processor 10 (or a core within processor 10) is operating at a performance state having a lower operating voltage (e.g., P1) and to multiply the base estimate value by a larger scaling factor (e.g., 1.0) if processor 10 (or a core within processor 10) is operating at a performance state having a higher operating voltage (e.g., P0). In some embodiments, unit 720 may be configured to store a plurality of scaling factors for different performance states and to select one of the scaling factors based on the current performance state of processor 10 (or a core within processor 10). In one embodiment, unit 720 is further configured to then adjust the selected scaling factor based on one or more received temperatures 612. For example, unit 720 may select a base estimate value (e.g., 0.47) for a given performance state (e.g., P1) and then adjust the selected value (e.g., 0.45) if processor 10 (or a core within processor) is operating at a temperature below the given temperature corresponding to the base estimate value.

In some embodiments, unit 720 is configured to determine a leakage power estimate for processor 10 (or a core within processor 10) by summing leakage power estimates calculated for functional blocks 110 or units 112. For example, in one embodiment, unit 720 may be configured to determine a leakage power estimate for a functional block 110 (or unit 112) by scaling a base estimate value that is specific to that functional block 110 (or unit 112). In other embodiments, unit 720 may be configured to use a common base estimate value that is an average estimate of power consumed by transistor leakage in functional blocks 110 (or units 112).

Leakage power estimation unit 720 is described in further detail below in conjunction with FIG. 8.

Adder 730, in one embodiment, is logic that is configured to add the switching power estimate produced by unit 710 and the leakage power estimate produced by unit 720 to produce a power consumption estimate 732 for processor 10 (or a core within processor 10). For example, adder 130 may add a switching power estimate (e.g., 8.3 W and a leakage power estimate (e.g., 4.3 W) to produce a power consumption estimate (e.g., 12.6 W). Adder 730 may be implemented using any of a variety of adders such as a ripple carry adder, carry look-ahead adder, etc., as well as any structure equivalent to an adder. In one embodiment, power manager unit 140 is configured to use power consumption estimate 723 to determine one or more performance states for processor 10 (or a core within processor 10) as described above.

Figure 8:
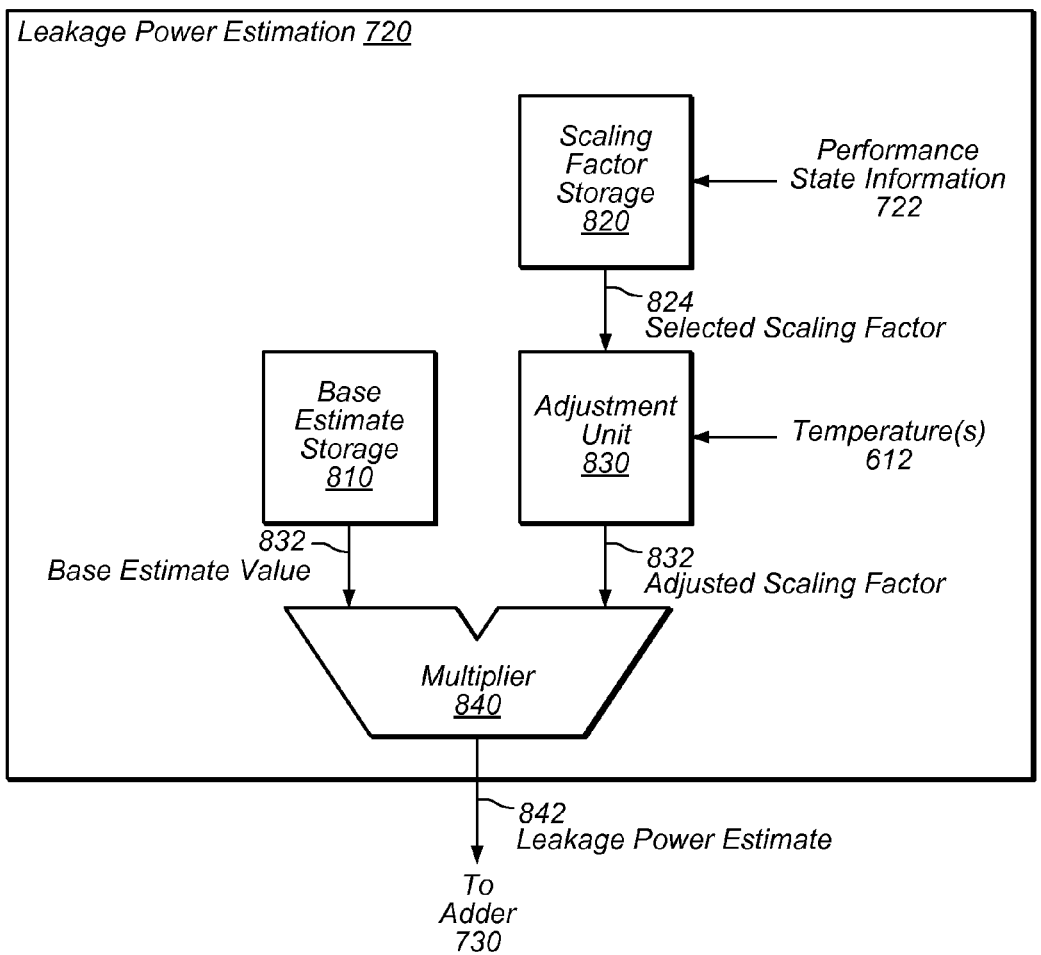
FIG. 8 is a block diagram of one embodiment of a leakage power estimation unit included in a power monitor unit.

Turning now to FIG. 8, one embodiment of a leakage power estimation unit 720 is depicted. In the illustrated embodiment, unit 720 includes base estimate value storage 810, scaling factor storage 820, adjustment unit 830, and multiplier 840. In some embodiments, storages 810 and 820 may not be considered as being a part of the same storage unit.

Base estimate value storage 810, in one embodiment, is configured to store one or more base estimate values used to determine leakage power estimates. In one embodiment, storage 810 includes one or more registers that are configured to store base estimate values, which may be adjustable (e.g., via JTAG, a BIOS, etc.). In another embodiment, storage 810 includes fuses that are blown to store base estimate values (e.g., during manufacture testing of processor 10). In the illustrated embodiment, storage 810 is configured to provide base estimate value 812 to multiplier 840. Base estimate value 812 may be any suitable base estimate value such as those described above.

Scaling factor storage 820, in one embodiment, is configured to store one or more scaling factors used to scale base estimate value 812. In various embodiments, storage 820 may be configured to store scaling factors in a similar manner as storage 810. In one embodiment, storage 820 is configured to select a scaling factor 824 from a plurality of scaling factors based on performance state information 722. For example, in some embodiments, storage 820 may store a respective scaling factor for each performance state supported by processor 10. Then, storage 820 may be configured to select scaling factor 824 in response to performance state information 722 indicating the current performance state of processor 10 (or a core within processor 10). In the illustrated embodiment, storage 820 is configured to provide the selected scaling factor 824 to adjustment unit 830.

Adjustment unit 830, in one embodiment, is configured to adjust selected scaling factor 824 based on one or more temperatures 612. That is, unit 830 may be configured to increase or decrease the scaling factor in response to temperatures 612 indicating that processor 10 (or a core within processor 10) is above or below a given threshold temperature associated with base estimate value 812. In some embodiments, unit 830 is configured to adjust selected scaling factor 824 based on an average of temperatures 612. In other embodiments, unit 830 is configured to adjust selected scaling factor 824 based on a highest temperature 612. In the illustrated embodiment, unit 830 is configured to provide the adjusted scaling factor 832 to multiplier 840.

Multiplier 840, in one embodiment, is logic that is configured to multiply base estimate value 812 and adjusted scaling factor 834 to produce leakage power estimate 842. In the illustrated embodiment, multiplier 840 is configured to provide leakage power estimate 842 to adder 730 to facilitate calculation of power consumption estimate 732.

It is noted that unit 720 may be configured differently than shown in FIG. 8. In one embodiment, unit 720 may be configured to determine leakage power estimate 842 by multiplying base estimate value 812, a first scaling factor selected based on performance state information 722, and a second scaling factor selected based on one or more temperatures 612. In another embodiment, storage 810 may include a plurality of base estimate values corresponding to different performance states. Thus, unit 720 may be configured to determine leakage power estimate 842 by multiplying a selected one of the base estimate values and a scaling factor determined based on one or more temperatures 612. In other embodiments, other techniques may be used to determine a leakage power estimate.

Turning now to FIG. 9, a table 900 illustrating an exemplary relationship of performance states and power consumption is depicted. As shown, table 900 lists a plurality of performance states that may be supported by processor 10 (e.g., P0-P4). Table 900 then lists operating voltages and frequencies associated with these performance states. For example, in one embodiment, if processor 10 is operating at P0, processor 10 may operate at 1.175V and at 2.70 GHz. Next, table 900 lists exemplary leakage power estimates and switching power estimates calculated when processor 10 (or a core within processor 10) is operating at one of the different performance states. Table 900 also lists the leakage scaling factors and switching scaling factors used to determine these leakage power estimates and switching power estimates, respectively. For example, the leakage power estimate 2.026 W may be determined by multiplying the base estimate value 4.311 W and the leakage scaling factor 0.47. As noted above, in some embodiments, the leakage scaling factor 0.47 may have been determined based on one or more temperatures 612 and/or performance state information 722. In one embodiment, the switching power estimate may be calculated in a similar manner. For example, the switching power estimate 4.484 W may be calculated by multiplying the base estimate value 8.304 W and the switching scaling factor 0.54. (Note that different base estimate values may be used for calculating switching and leakage power estimates.) To calculate the total power consumption estimate, the leakage power estimate and the switching power estimate are added—e.g., 6.510 W≈4.311 W*0.47+8.304 W*0.54.

Figure 10:
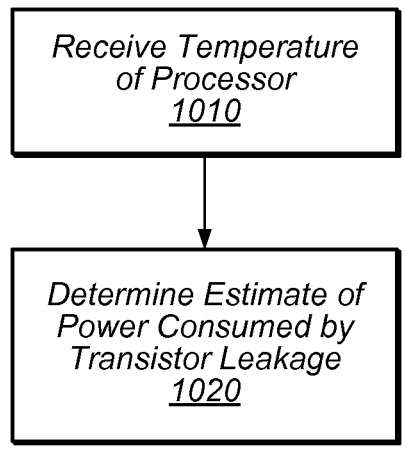
FIG. 10 is a flow diagram of one embodiment of a method for determining an estimate of power consumed by transistor leakage of a processor.

Turning now to FIG. 10, a flow diagram of a method 1000 is depicted. Method 1000, which may be performed by processor 10 in one embodiment, is a method for determining an estimate of power consumed by transistor leakage. In some embodiments, performing method 1000 may improve the performance of processor 10 by increasing the consistency and accuracy of calculating the power consumed by processor 10.

In step 1010, a power monitor unit (e.g., power monitor unit 130) receives a temperature of processor 10. In one embodiment, the temperature may be measured by a temperature sensor (e.g., temperature sensor 610). In another embodiment, processor 10 calculates the temperature based on a temperature model that estimates temperatures based on measured power consumptions. In some embodiments, the temperature may be an average of measured temperatures of processor 10. In some embodiments, the temperature may be a highest measured temperature of processor 10.

In step 1020, the power monitor unit determines an estimate of power consumed by transistor leakage. In one embodiment, to determine the estimate, the power monitor unit multiplies a base value (e.g., base estimate value 812 read from storage 810) and a scaling factor (e.g., scaling factor 832) that is adjusted based on the received temperature. In one embodiment, the base value corresponds to an estimate of the power consumed by processor 10 during one or more maximum operating conditions—e.g., when processor 10 is operating at a maximum operating frequency, a maximum temperature threshold, and/or a maximum performance state, or some combination thereof. In one embodiment, the power monitor unit selects the scaling factor (e.g., selected scaling factor 824) from a plurality of scaling factors based on a determined performance state of processor 10 (e.g., performance state information 722). In some embodiments, the base value and the plurality of scaling factors are stored in processor 10 by blowing a set of fuses (e.g., at the time of manufacture).

In one embodiment, the power monitor unit determines an estimate of the total amount of power consumed (e.g., power consumption estimate 732) based on the estimate of power consumed by transistor leakage (e.g., leakage power estimate 842) and on an estimate of power consumed by transistor switching of the processor. In one embodiment, processor 10 (e.g., using power manager unit 140) may then select a performance state based on the estimate of the total amount of power consumed.

Exemplary Computer System

Figure 11:
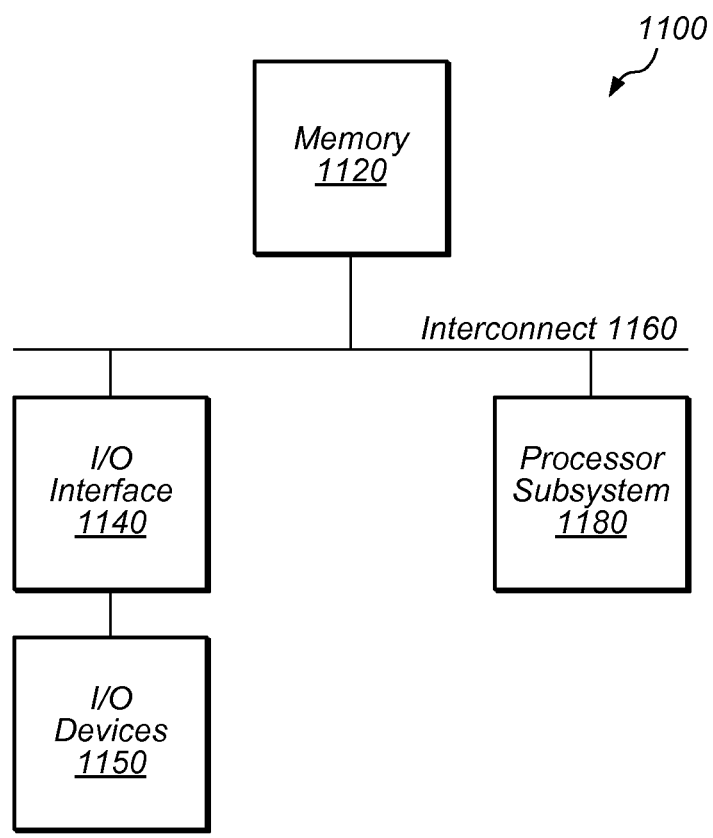
FIG. 11 is a block diagram illustrating one embodiment of an exemplary computer system.

Turning now to FIG. 11, one embodiment of an exemplary computer system 1100, which may include processor 10, is depicted. Computer system 1100 includes a processor subsystem 1180 that is coupled to a system memory 1120 and I/O interfaces(s) 1140 via an interconnect 1160 (e.g., a system bus). I/O interface(s) 1140 is coupled to one or more I/O devices 1150. Computer system 1100 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Computer system 1100 may also be any type of networked peripheral device such as storage devices, switches, modems, routers, etc. Although a single computer system 1100 is shown for convenience, system 1100 may also be implemented as two or more computer systems operating together.

Processor subsystem 1180 may include one or more processors or processing units. For example, processor subsystem 1180 may include one or more processing units (each of which may have multiple processing elements or cores) that are coupled to one or more resource control processing elements 1120. In various embodiments of computer system 1100, multiple instances of processor subsystem 1180 may be coupled to interconnect 1160. In various embodiments, processor subsystem 1180 (or each processor unit or processing element within 1180) may contain a cache or other form of on-board memory. In one embodiment, processor subsystem 1180 may include processor 10 described above.

System memory 1120 is usable by processor subsystem 1180. System memory 1120 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1100 is not limited to primary storage such as memory 1120. Rather, computer system 1100 may also include other forms of storage such as cache memory in processor subsystem 1180 and secondary storage on I/O Devices 1150 (e.g., a hard drive, storage array, etc.). In some embodiments, these other forms of storage may also store program instructions executable by processor subsystem 1180.

I/O interfaces 1140 may be any of various types of interfaces configured to couple to and communicate with other devices, according to various embodiments. In one embodiment, I/O interface 1140 is a bridge chip (e.g., Southbridge) from a front-side to one or more back-side buses. I/O interfaces 1140 may be coupled to one or more I/O devices 1150 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1100 is coupled to a network via a network interface device.

Program instructions that are executed by computer systems (e.g., computer system 1100) may be stored on various forms of computer readable storage media. Generally speaking, a computer readable storage medium may include any non-transitory/tangible storage media readable by a computer to provide instructions and/or data to the computer. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In some embodiments, a computer-readable storage medium can be used to store instructions read by a program and used, directly or indirectly, to fabricate hardware for processor 10 described above. For example, the instructions may outline one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 10. The netlist may then be placed and routed to produce a data set describing geometric shapes to be applied to masks. The masks may then be used in various semiconductor fabrication steps to produce a semiconductor circuit or circuits corresponding to processor 10.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An integrated circuit, comprising:
  a power monitor unit configured to:
    receive a temperature of the integrated circuit and performance state information specifying a performance state of the integrated circuit, wherein the performance state is a state in which the integrated circuit is configured to execute instructions at a particular voltage and a particular frequency, and wherein the performance state is a performance state in accordance with an Advanced Configuration and Power Interface (ACPI) standard; and
    determine an estimate of power consumed by transistor leakage of the integrated circuit based on the received temperature and the performance state information.

2. The integrated circuit of claim 1, wherein, to determine the estimate, the power monitor unit is configured to:
  adjust a scaling factor based on the received temperature; and
  multiply a base value and the adjusted scaling factor to produce the estimate.

3. The integrated circuit of claim 2, wherein the power monitor unit is configured to select the scaling factor from a plurality of scaling factors based on the performance state of the integrated circuit.

4. The integrated circuit of claim 3, further comprising:

a memory storing the base value and the plurality of scaling factors, wherein the memory is implemented using blown fuses.

5. The integrated circuit of claim 2, wherein the base value corresponds to an estimate of power consumed by the integrated circuit during one or more maximum operating conditions.

6. The integrated circuit of claim 1, wherein the integrated circuit is configured to:
determine a total power estimate of power consumed by the integrated circuit based on the estimate of power consumed by transistor leakage; and
implement a performance state based on the total power estimate.

7. The integrated circuit of claim 6, wherein the total power estimate is further determined based on an estimate of power consumed by transistor switching of the integrated circuit.

8. The integrated circuit of claim 1, further comprising:
a temperature sensor configured to determine the temperature of the integrated circuit.

9. The integrated circuit of claim 1, wherein the integrated circuit is configured to:
determine the temperature based on one or more power measurements without using a temperature sensor.

10. A processor, comprising:
a power monitor unit configured to:
receive performance state information of the processor, wherein the performance state information specifies an Advanced Configuration and Power Interface (ACPI) performance state, wherein the ACPI performance state is indicative of a state in which the processor operates at a particular one of a plurality of voltages and a particular one of a plurality of frequencies; and
determine an estimate of power consumed by transistor leakage of the processor based on the performance state information.

11. The processor of claim 10, wherein, to determine the estimate, the power monitor unit is configured to multiply a base estimate and a scaling factor, wherein the power monitor unit is configured to select the scaling factor from among a plurality of scaling factors based on the received performance state information.

12. The processor of claim 11, wherein the power monitor unit is configured to:
receive a temperature of the processor; and
adjust the scaling factor based on the temperature prior to multiplying the base estimate and the scaling factor.

13. The processor of claim 10, wherein the power monitor unit is further configured to determine an estimate of power consumed by transistor switching of the processor; and
wherein the processor is configured to implement a performance state based on the estimate of power consumed by transistor leakage and the estimate of power consumed by transistor switching.

14. The processor of claim 10, further comprising:
a plurality of cores;
wherein the received performance state information includes a performance state of a first core of the plurality of cores, and wherein the determined estimate is an estimate of power consumed by transistor leakage of the first core of the processor.

15. A method, comprising:
a processor obtaining a base estimate of power consumed by transistor leakage of the processor; and
the processor scaling the base estimate based on a performance state of the processor and a temperature of the processor, wherein the performance state is a performance state in accordance with an Advanced Configuration and Power Interface (ACPI) standard.

16. The method of claim 15, further comprising:
the processor determining an estimate of power consumed by transistor switching of the processor; and
the processor adding the scaled base estimate and the estimate of power consumed by transistor switching to calculate a total amount of power consumed by the processor.

17. The method of claim 16, further comprising:
the processor implementing a performance state based on the total amount of power consumed by the processor.

18. The method of claim 15, wherein the base value corresponds to an estimate of the power consumed by the processor during one or more maximum operating conditions.

19. The method of claim 15, wherein the temperature is an average temperature calculated based on a plurality of temperatures of the processor.

20. A non-transitory computer readable medium comprising a data structure which is operated upon by a program executable on a computer system, the program operating on the data structure to perform a portion of a process to fabricate an integrated circuit including circuitry described by the data structure, the circuitry described in the data structure including:
a power monitor unit configured to receive a temperature of the integrated circuit and an indication of a performance state at which the integrated circuit operates, wherein the performance state is a performance state in accordance with an Advanced Configuration and Power Interface (ACPI) standard;
wherein the power monitor unit is configured to determine an estimate of power consumed by transistor leakage of the integrated circuit, wherein the estimate is based on the received temperature and the performance state.

21. The computer readable medium of claim 20, wherein the storage medium stores hardware description language (HDL) data, Verilog data, or graphic database system II (GDSII) data.

* * * * *